United States Patent Office 3,313,637
Patented Apr. 11, 1967

3,313,637
PROCESS FOR PRODUCTION OF LOST MODELS IN PRECISION CASTING OPERATIONS
Hans Schneider, Winterthur, Switzerland, assignor to Sulzer Brothers Limited, Winterthur, Switzerland, a Swiss company
No Drawing. Filed July 30, 1963, Ser. No. 298,787
Claims priority, application Switzerland, Aug. 2, 1962, 9,285/62
9 Claims. (Cl. 106—38.5)

The present invention pertains to a method of producing "lost" models for use in the making of precision castings by means of the method known generally as the lost wax or "cire perdue" process. The method of the invention employs for such models a finely divided crystalline material soluble in liquid. The invention takes as its point of departure a known process in which the model is made from a mixture of crystalline material and of a plasticizer.

In a known process powdered urea is mixed with powdered polyvinyl alcohol and the mixture is heated in a plastic pressing or molding machine until the urea achieves a molten state. The molten mass together with the softened polyvinyl alcohol is then formed to the shape of the desired model by means of a metallic form. The crystalline structure of the urea provides in such models a much greater strength even at elevated ambient temperatures than do models made of wax or of synthetic thermoplastic materials. In addition, models made of urea are water soluble and can hence be separated, at least in part, from the molds which are made with the help thereof by dissolving of the model in water, instead of requiring a melting or burning away thereof. The polyvinyl alcohol contained in the model serves to counteract the natural brittleness of the urea, and thereby to avoid crumbling at sharp edges in the model.

The known process just described is however subject to disadvantages when employed for the working of the model material in the fluid state, i.e. at temperatures above 130° C., and particularly in consequence of the formation of large single crystals upon cooling of the model material in a metallic mold. Such large crystals increase the brittleness of the model. Upon working of the model material in ordinary presses, complicated valves must moreover be provided if the molten mixture is to be prevented from emerging through the injection nozzle, unless counter-pressure is applied.

It is theoretically possible to counteract or diminish these shortcomings by increasing the proportion of the polyvinyl alcohol plasticizing agent. Such a course however leads to reappearance in pronounced degree of the disadvantages of thermoplastics for use as model materials. Especially at high ambient temperatures and in the warm seasons of the year, the rigidity of the models thus obtained is insufficient, and the dimensional stability thereof is adversely affected by the creeping of the material which takes place during the cooling of the model in the form in which it is made and also after withdrawal thereof from such form. Moreover the internal stresses which arise in models made largely of thermoplastic materials on heating of the model in order to melt or burn it out of the mold which has been cast or otherwise formed about it may lead to deformations of the model thus in process of removal, resulting in cracks in the mold.

The present invention surmounts these disadvantages to a large extent. The process according to the invention is characterized by the fact that there is prepared a mixture of a finely divided crystalline material, of a liquid solvent therefor and of a likewise finely divided material constituting a vehicle for the solvent and having the property of swelling on contact with that solvent. In this mixture, and given a substantially constant condition for the mixture, the solvent is so physically bound to the vehicle that by changes in pressure and temperature the mixture can be so affected that the bond between the solvent and the vehicle is at least partially removed, the model being simultaneously or subsequently formed by plastic deformation of the mixture under pressure.

The process of the invention makes it possible to achieve a simplicity in the manufacture of models for lost wax castings comparable to that which is available when synthetic thermoplastic materials are employed. At the same time there is obtained as an end product a model body which is distinguished by improved strength and dimensional stability, in consequence of its primarily crystalline structure. More particularly, this effect results from the fact that the vehicle or carrier material, swollen by mixing with the solvent liquid, possesses in the crystalline mass the same effect as would have a much larger quantity of a synthetic thermoplastic material operating as a plasticizing agent without admixture of fluid. A model body produced according to the process of the invention can be worked with normal pressures in the usual presses of the art, and in particular at temperatures which are substantially below the melting temperature of the crystalline material and also below the softening temperature of the vehicle material. Under the influence of pressure and temperature changes taking place in the process of plastic deformation, the bond between the vehicle material and the solvent fluid is at least partially dissolved, and the finely divided solvent fluid, now free in the mass, dissolves particles of the crystalline material coming into contact therewith. From the supersaturated solution (of crystalline material in the solvent) which develops on cooling, there consequently form crystals, of greater or less size, according to the rate of cooling. In this process the solvent liquid bonds itself additively to the crystalline material and remains bound thereto in the finished model, whereas the vehicle material, wholly or partly freed from the solvent, serves to improve the stability properties of the article via action as a plasticizing agent, in a method known in and of itself.

The crystalline material may advantageously be an organic one, for example the urea already mentioned. Models made therefrom according to the invention may be separated from the molds which are made around them and with the help thereof, and in which molds the ultimately desired casting is to be poured, not only by dissolution of the model but by melting or burning it out. The crystalline material may however be of another nature, for example sodium chloride.

In order to facilitate formation of the solution of crystalline material in the liberated solvent during plastic working of the mass, it is desirable that the crystalline material employed possess a particle size below 0.5 millimeters. Alternatively the crystalline material may be partly thus finely divided and partly of coarser but preferably uniform particle size.

For the vehicle material it is advantageous to use a synthetic thermoplastic material which is water soluble such as polyvinyl alcohol. It is however possible to employ in accordance with the invention an adhesive material capable of swelling, such as gum arabic or dextrin.

The invention will now be described with respect to a number of examples, in which all percentage figures are in terms of percent by weight.

*Example 1*

Eighty-five percent of powdered urea having a particle size between 0.1 and 0.3 mm. and ten percent of polyvinyl alcohol are thoroughly mixed together. The polyvinyl alcohol has advantageously about the same particle size as the urea and its polymerization number lies between 200 and 300. There are then added five percent of water, and the mixing is continued to achieve a uniform mixture capable of flowing smoothly. The resulting mixture is stable over long periods of time on condition that it be protected from contact with the air so as to prevent evaporation of the water contained therein. The water is, at least for the most part, physically bound to the polyvinyl alcohol, which swells upon taking up water.

The mixture is then subjected to plastic working in a press for plastics, which may be of any usual and suitable type, the temperature, in the plastic mass being approximately 60 to 70° C. and the pressure being some 60 kilograms per square centimeter. After pressing, the resulting product, as for example a model for a turbine blade, can immediately be extracted from the matrix in which it was formed. This product (model body) is distinguished by the fidelity with which it reproduces even the finest lines and edges of the matrix. At this stage however the model has still some what elastic properties.

By the combined action of pressure and temperature during the pressing step, the bond between the water and the synthetic material is for the most part dissolved and the liberated water serves to dissolve urea particles coming into contact therewith. It may be assumed that in this condition, i.e. upon removal of the model body from the matrix, the finely divided particles of the crystalline material dissolved in the mass of the model body are responsible for the elastic properties above noted.

Upon a subsequent cooling, advantageously carried out in air, this elasticity disappears to a substantial degree because the dissolved particles of urea crystallize out into crystals of urea. By control of the rate of cooling it is possible to govern within wide limits the magnitude of the resulting crystals. Rapid cooling, as for example artificially hastened cooling of the matrix in which the mold body is formed, produces small crystals, of smaller average size than the smallest urea crystals in the starting material. In contrast, slow cooling leads to aligned growth of individual crystals having a preponderant long dimension beginning at core or armature elements. These have the merit of improving the strength of the model body, at some cost in toughness. Such large crystals may possess a length of the order of 3 millimeters for an average middle diameter from 0.1 to 0.3 millimeters. On rapid cooling of the model body one obtains in contrast a higher degree of toughness and a somewhat reduced strength. It may further be assumed that solvent water left behind upon dissolution of the physical bond between the polyvinyl alcohol and water combines additively to the urea molecule, i.e. as water of crystallization, the change in the polyvinyl alcohol produced by the heating (e.g. in the press) so reducing the capacity of that material to swell that the water of solution remains so combined with the urea.

Model bodies produced according to the process of this example are characterized by optimum dimensional stability and surface quality. They preserve these properties over an indefinite storage time and even at the elevated ambient temperatures of summer.

To form a precision mold from such a model body there may be employed a mold material obtained by mixing a solution of 0.5 liters of ethyl silicate, 2.5 liters of alcohol, 0.5 liters of water and 5 cubic centimeters of hydrochloric acid (32%) together with 18 kilograms of zirconium sand. The model body is repeatedly dipped in this material to form thereon a water resistant coating of for example 6 to 10 millimeters thickness. In this step care should be taken to insure that the part of the model body which is to form the pouring gate in the mold is free to the exterior. The mold thus obtained is allowed to dry in air for several hours and is thereupon brought, together with the model body within it, into a solvent bath. The solvent is water, possessing the capacity to dissolve the urea and the polyvinyl alcohol. The process of dissolving can be allowed to go to completion or to proceed only part way, in which latter event the residuum of the model body left behind will be removed by combustion in the subsequent firing of the mold. The firing may be carried out in an oven, for example over a six hour period at a temperature of 800° C. Upon withdrawal of the mold from the oven, molten metal is poured into the mold cavity thus obtained. The resulting casting is characterized by excellent dimensional stability and surface quality. Dimensional stabilities of plus or minus one part in a thousand can be maintained.

*Example 2*

Seventy-five percent sodium chloride are mixed with fifteen percent polyvinyl alcohol having a polymerization number between 200 and 300. To this mixture ten percent of water is added. The shaping of the model body is effected in a press at 75° C. and 55 kilograms per square centimeter pressure.

The model bodies obtained again exhibit excellent dimensional stability and surface quality. They may be separated from the molds produced therewith by dissolving in water.

*Example 3*

For the production of model bodies there is used a mixture of eighty-five percent urea, ten percent gum arabic, and five percent water. The model body is formed from this mass in a press at a temperature of 60° C. and at a pressure of fifty kilograms per square centimeter.

Excellent surface quality and dimensional stability are obtained, the model bodies being separated from the molds made therefrom by melting or combustion, i.e. by burning the model bodies out of the molds.

*Example 4*

There is employed for the production of the model body a mixture comprising seventy-five percent urea, twenty percent dextrin as a carrier or vehicle, and five percent water, the latter being added to an initial mixture prepared from the two first-named ingredients. Further processing is carried out according to the process described in the preceding examples. The resulting model is characterized by excellent stability characteristics, surface properties, and dimensional fidelity. It may be extracted from the mold produced therefrom by partially melting out the model body and then by burning out the remainder.

The invention is not limited to the examples which have been described. For example, the vehicle for the solvent liquid can be brought to swelling by initial, preliminary mixing with the fluid and may in this condition be mixed with the crystalline material. With this procedure however a kneading type of mixer is desirable.

It is also possible for example, when urea is used as the crystalline material and polyvinyl alcohol as carrier or vehicle, to use another solvent such as ethyl alcohol in place of water. A suitable starting mixture comprises for example eighty percent urea, ten percent polyvinyl alcohol and ten percent ethyl alcohol. Also other crystalline materials than urea or a salt may be used. Suitable materials are adipic acid, caprolactam, gluconic acid or gluconic acid lactone, and that in similar height proportions as indicated for urea in Examples 1 and 2. These organic crystalline materials may be used together with water as solvent.

What is claimed is:

1. A process for the manufacture of a lost model for use in the making of precision castings which comprises mixing a major portion by weight of a finely divided crystalline material, a minor portion by weight of a finely divided organic material and a liquid solvent for said crystalline material to form a flowable pattern mixture for said lost model, said liquid solvent capable of being solvent absorbed by said organic material upon contact therewith to cause swelling of the organic material and being capable of forming a physical bond with said organic material breakable by alternations of pressure and compressing said pattern mixture to cause plastic deformation at a pressure sufficient to at least partially break said physical bond and to remove said absorbed solvent from said organic material whereby the released solvent partially dissolves the crystalline material and serves as lubricant in forming the lost model.

2. A process according to claim 1 wherein the crystalline material has a particle size less than about 0.5 millimeter.

3. A process according to claim 1 wherein the crystalline material is selected from the group consisting of urea, sodium chloride, adipic acid, caprolactam, gluconic acid, and gluconic acid lactone.

4. A process according to claim 1 wherein the organic material is polyvinyl alcohol, gum arabic or dextrin.

5. A process according to claim 1 wherein the finely divided crystalline material is urea, the organic material is polyvinyl alcohol and the liquid solvent is water or ethyl alcohol.

6. A process according to claim 1 wherein the crystalline material is urea, the organic material is gum arabic, and the liquid solvent is water.

7. A process according to claim 1 wherein the crystalline material is urea, the organic material is dextrin, and the liquid solvent is water.

8. A process according to claim 1 wherein the crystalline material is sodium chloride, the organic material is polyvinyl alcohol, and the liquid solvent is water.

9. The lost model prepared according to the process described in claim 1.

References Cited by the Examiner

UNITED STATES PATENTS

| | | | |
|---|---|---|---|
| 3,059,282 | 10/1962 | Smith | 264—221 |
| 3,121,768 | 2/1964 | Boyer | 264—337 |
| 3,179,523 | 4/1965 | Moren | 106—38.5 |
| 3,200,178 | 8/1965 | Matsubayashi et al. | 264—185 |

FOREIGN PATENTS

| | | |
|---|---|---|
| 754,823 | 8/1956 | Great Britain. |
| 872,640 | 7/1961 | Great Britain. |

ALEXANDER H. BRODMERKEL, *Primary Examiner.*

ALFRED L. LEAVITT, *Examiner.*

L. HAYES, *Assistant Examiner.*